US 8,340,164 B2

(12) United States Patent
Gessner

(10) Patent No.: US 8,340,164 B2
(45) Date of Patent: Dec. 25, 2012

(54) EVALUATION OF THE FEEDBACK QUALITY IN COMMUNICATIONS SYSTEMS

(75) Inventor: Christina Gessner, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 339 days.

(21) Appl. No.: 12/602,746

(22) PCT Filed: Apr. 2, 2009

(86) PCT No.: PCT/EP2009/002436
§ 371 (c)(1),
(2), (4) Date: Dec. 23, 2009

(87) PCT Pub. No.: WO2009/129917
PCT Pub. Date: Oct. 29, 2009

(65) Prior Publication Data
US 2010/0177813 A1    Jul. 15, 2010

(30) Foreign Application Priority Data
Apr. 22, 2008    (DE) .......................... 10 2008 020 141

(51) Int. Cl.
*H04B 3/46*   (2006.01)
*H04B 17/00*  (2006.01)
*H04Q 1/20*   (2006.01)

(52) U.S. Cl. ......... 375/224; 375/296; 375/285; 375/346

(58) Field of Classification Search .................. 375/224, 375/296, 259–260, 228, 285, 346; 455/115.1, 455/115.2, 226.1, 67.14, 67.11, 69, 70
See application file for complete search history.

(56) References Cited

U.S. PATENT DOCUMENTS

| | | | |
|---|---|---|---|
| 5,982,760 A | 11/1999 | Chen | |
| 7,715,318 B2* | 5/2010 | Haghighat et al. | 370/235 |
| 8,041,308 B2* | 10/2011 | Yun et al. | 455/69 |
| 2002/0081977 A1* | 6/2002 | McCune, Jr. | 455/67.1 |
| 2003/0148770 A1 | 8/2003 | Das et al. | |
| 2004/0131028 A1* | 7/2004 | Schiff et al. | 370/329 |
| 2005/0170782 A1 | 8/2005 | Rong et al. | |
| 2008/0233902 A1* | 9/2008 | Pan et al. | 455/114.3 |
| 2009/0060064 A1* | 3/2009 | Futaki et al. | 375/260 |
| 2010/0309793 A1* | 12/2010 | Choi et al. | 370/252 |

FOREIGN PATENT DOCUMENTS

EP    1890413 A2    2/2008

OTHER PUBLICATIONS

International Search Report for PCT/EP2009/002436 dated Jul. 16, 2009.

* cited by examiner

*Primary Examiner* — Jean B Corrielus
(74) *Attorney, Agent, or Firm* — Marshall, Gerstein & Borun LLP

(57) ABSTRACT

A measuring system is used for testing a feedback signal transmitted by a communications device within a communications system. The measuring system comprises an antenna system and a measuring device. The measuring device transmits a signal to a communications device via the air interface and the antenna system. The communications device receives the signal and generates a feedback signal dependent upon transmission conditions of the signal, which it has determined, and transmits it to the measuring device. The measuring device measures the actual reception quality of the signal in the communications device.

14 Claims, 4 Drawing Sheets

EVALUATION OF THE FEEDBACK QUALITY IN COMMUNICATIONS SYSTEMS

BACKGROUND OF THE INVENTION

1. Field of the Invention

The invention relates to a measuring system and a method for determining the quality of the feedback (feedback) of the received-signal quality transmitted by communications devices within communications systems, especially MIMO communications systems (Multiple-Input Multiple-Output communications systems).

2. Related Technology

In communications systems, such as UMTS or WiMax, the feedback transmitted by participating devices with reference to the channel quality is conventionally used for the adaptation of the transmission, for example, of the base station. For instance, in a closed-loop method, the pre-coding is modified in order to guarantee optimum reception at the terminal-device end. However, this method relies on as accurate an estimation of the transmission conditions or mobile-radio channel properties as possible at the receiver end. Although the participating devices are equipped with corresponding functions, no methods and devices for the verification of the correct function are so far known.

For example, European Patent Application EP 1 890 413 A2 discloses methods and devices for the transmission and reception of such feedback information from a communications device to a base station. However, a verification of this feedback information is not disclosed.

SUMMARY OF THE INVENTION

The invention provides a measuring system and a measuring method which, with a low cost, tests the feedback signals from communications devices.

A measuring system for testing a feedback signal transmitted by a communications device within a communications system comprises an antenna system and a measuring device. The measuring device transmits a signal to a communications device via the air interface and the antenna system. The communications device receives the signal and generates a feedback signal dependent upon the transmission conditions it has determined and transmits it to the measuring device. The measuring device measures the actual reception quality of the signal in the communications device. In this context, the measuring system implements the following stages:

- the measuring system modifies the signal transmitted to the communications device in such a manner that the transmitted feedback signal displays no further possibility of improvement of the transmission conditions;
- the transmitted signal and/or the position of the communications device and/or of the antenna system is modified by the measuring device;
- the measuring device compares the feedback signal and the actual reception quality and in this manner determines the quality of the feedback signal. Accordingly, the testing of the feedback signal is guaranteed. The cost of the measuring system is low.

By preference, the measuring device is connected to the communications device. The measuring device preferably determines the actual reception quality by determining the bit-error rate and/or the data rate. A simple determination of the actual transmission quality is therefore achieved.

The antenna system is advantageously a multiple antenna system. By preference, the communications device receives the signals by means of several antennae. In particular, in communications systems of high complexity, it is possible to determine the accuracy of the feedback signals at low cost.

The measuring device preferably brings about the modification of the signal transmitted to the communications device by modifying a beam pattern (beam pattern) and/or by modifying a pre-coding and/or by modifying a number of data streams of the signal transmitted using the multiplex method. Through the verification of the feedback signals, a more precise adjustment of the signal is therefore possible.

The feedback signal advantageously contains instructions for the modification of the signal transmitted to the communications device for the improvement of the transmission conditions. Especially within a closed-loop system of this kind, a high precision of the feedback signal is necessary. This is achieved by the measuring system and method according to the invention.

By preference, the measuring device comprises a transmitter and a receiver. The transmitter and the receiver are preferably connected to the antenna system. Accordingly, the use of further components is not necessary. Moreover, a simple calibration of the measuring system is achieved in this manner.

The measuring system preferably comprises a display device. The display device preferably presents intermediate results and/or results and/or parameters of the measurement. This guarantees an intuitive operation and logically-arranged display of the measurement results.

The communications system is preferably a MIMO communications system. Especially in communications systems of high complexity, a low-cost for determining the accuracy of the feedback signals is possible.

BRIEF DESCRIPTION OF THE DRAWINGS

The invention is described by way of example below with reference to the drawings, in which an advantageous exemplary embodiment of the invention is presented. The drawings are as follows.

DETAILED DESCRIPTION

The structure and function of a MIMO communications system will first be explained with reference to FIG. 1. With reference to FIGS. 2-5, the structure and function of various exemplary embodiments of the measuring system according to the invention will then be explained. The presentation and description of identical elements in similar drawings has not been repeated in some cases.

Figure 1:
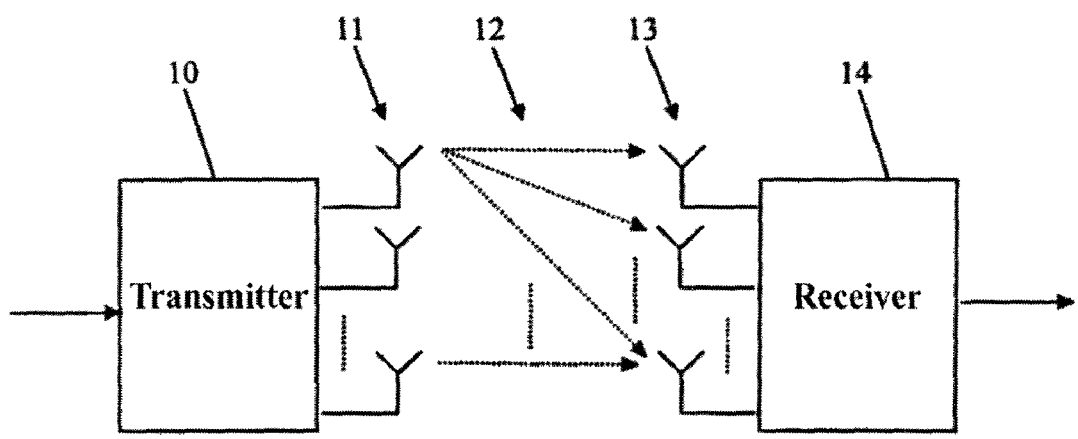
FIG. 1 shows an exemplary communications system.

FIG. 1 shows an exemplary communications system. The transmitter 10 is connected to several spatially-separate antennae 11. A receiver 14 is also connected to several spatially-separate antennae 13. The transmitter 10 transmits signals via the antennae 11. In this context, the signals are not necessarily identical. The signals are propagated over the propagation paths 12 and are received by the receivers 14 via the antennae 13. In this context, with N antennae 11 at the transmitter end and M antennae 13 at the receiver end, there are N*M propagation paths. By supplying the antennae 11 through the transmitters 10 with signals only slightly different in amplitude and phase, the totality of the antennae 11 can be impressed with a beam pattern corresponding to a single antenna. This factual situation will be explained in greater detail with reference to FIG. 2 and FIG. 3.

Figure 2:
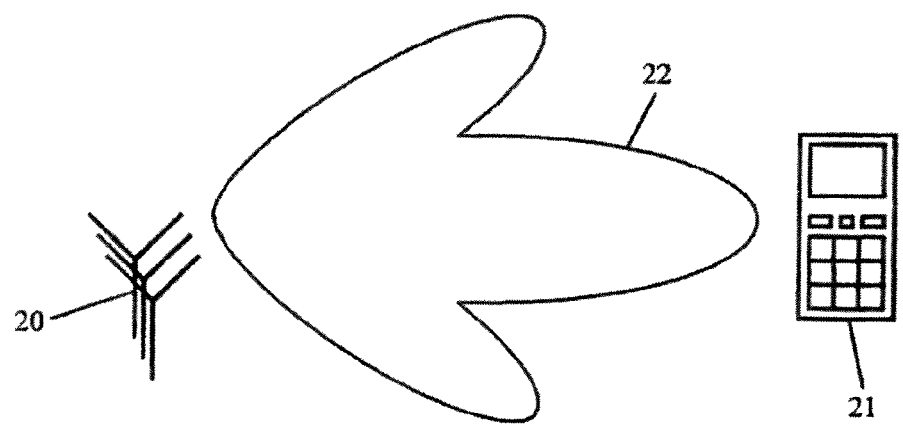
FIG. 2 shows a first exemplary communications link.

FIG. 2 presents a first exemplary communications link. An antenna system 20 is connected to a communications device 21. In this context, the antenna system 20 consists of a plurality of individual antennae arranged in a spatially-separate manner. Each individual antenna provides its own beam pattern (beam pattern). The signals transmitted by the antennae differ from one another only slightly in amplitude and phase. Accordingly, a common beam pattern 22 is obtained for the overall antenna system 20. In this context, the schematically presented beam pattern 22 of the antenna system 20 is orientated in such a manner that the strongest propagation direction coincides with the communications device 21. The beam pattern can be modified by varying the amplitude and phase displacements of the antennae of the antenna system 20. This is illustrated with reference to FIG. 3.

Figure 3:
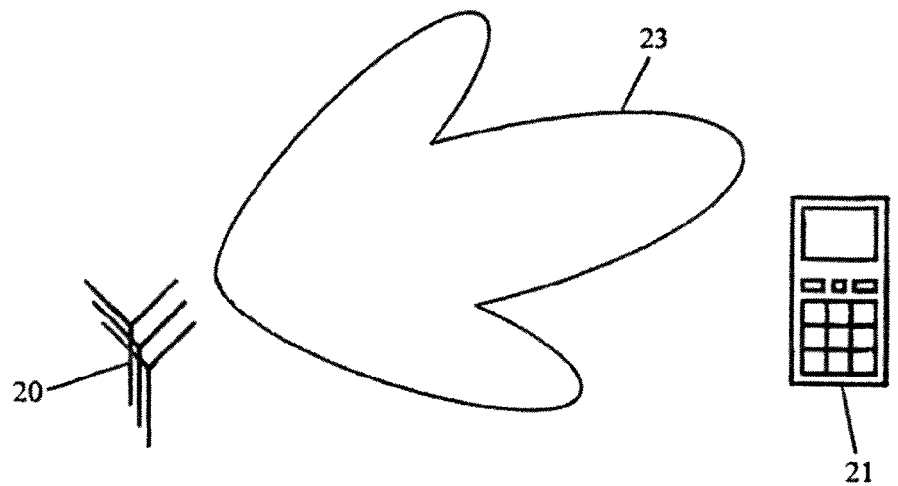
FIG. 3 shows a second exemplary communications link.

FIG. 3 shows a second exemplary communications link. By comparison with the communications link shown in FIG. 2, the amplitude and phase displacements of the antennae of the antenna system 20 have been modified. Accordingly, a different beam pattern 23 is obtained. The strongest propagation direction is now no longer disposed on the communications device 21 but above it. Accordingly, the transmission quality is poorer than in FIG. 2. The communications device 21 determines the transmission conditions of the received signal and determines from this a feedback signal (feedback signal), which it communicates to the transmitter. In this context, the feedback signal contains instructions to the transmitter for the modification of the signal transmitted to the communications device 21 in order to achieve the best possible transmission conditions. In consequence, the transmitter adapts the signal, for example, corresponding to the beam pattern. The goal is to achieve an optimum reception quality of the communications device 21. A displacement of the beam pattern as presented with reference to FIG. 2 and FIG. 3 can also be achieved through a simple rotation of the antenna system 20.

However, in order to implement the adaptation of the signal illustrated here, for example, by tracking the beam pattern, the most accurate possible feedback signal is necessary. A measuring system for testing the accuracy of the feedback signal generated by a communications device is explained with reference to FIG. 4 and FIG. 5.

Figure 4:
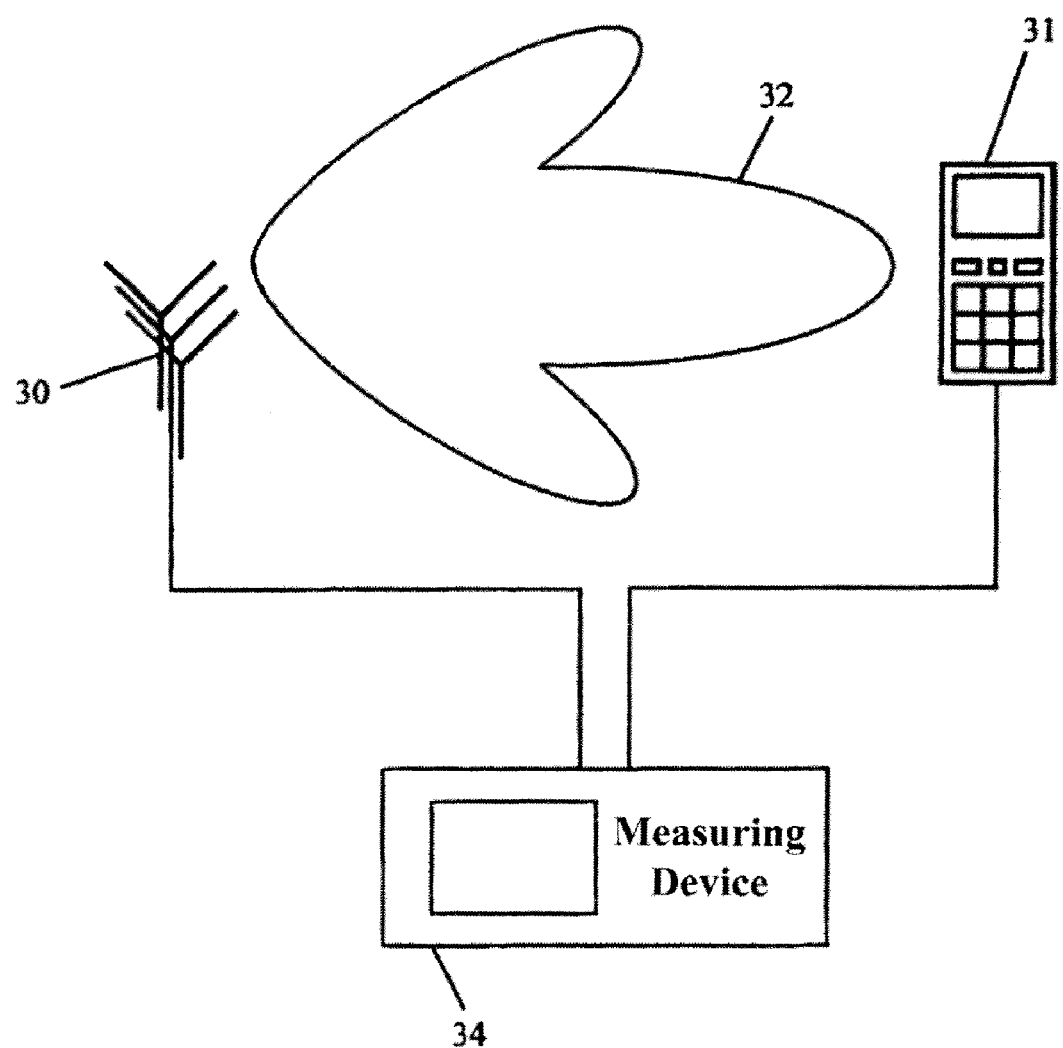
FIG. 4 shows a first exemplary embodiment of the measuring system according to the invention.

FIG. 4 shows a first exemplary embodiment of the measuring system according to the invention. An antenna system 30 consisting of several spatially separate antennae is connected to a measuring device 34. Furthermore, the measuring device 34 is connected to a communications device 31.

The measuring device 34 transmits to the communications device 31 via the antenna system 30 with a beam pattern 32. The communications device 31 receives the signal and determines internally the transmission conditions. It transmits the feedback signal via the air interface and the antenna system 30 to the measuring device 34. In this context, the feedback signal is dependent on the measured transmission conditions. It contains instructions regarding how the transmitted signal is to be modified in order to improve the transmission conditions. Alternatively, it can directly reflect the reception quality of the signal. This feedback signal is recorded by the measuring device 34. This can take place continuously or at given intervals. A cable-bound communication of the feedback signal is also conceivable. For example, the communications device 31 in the exemplary embodiment does not transmits the feedback signal to the measuring device 34 via the air interface and the antenna system 30, but also communicates it via the direct connection.

At the same time, the measuring device 34 determines the actual reception quality via the direct link to the communications device 31. This is implemented, for example, by measuring the transmitted data volume or by determining the bit-error rate. The quality of the feedback signal can be estimated by comparison of the feedback signal and the actual reception quality.

For a further increase in the accuracy of the measurement, the method described below can be used. The measuring device 34 adapts the signals, which are transmitted via the antenna system 30, until the communications device 31 transmits a feedback signal, which displays no further possibility for improvement of the transmission conditions. This can take place by a repetition of implemented signal-adaptation instructions as already explained, by an absence of further signal-adaptation instructions or a display of a maximum reception quality. At the same time, the measuring device 34 measures the actual reception quality, as described above. Following this, the measuring device 34 modifies the signals transmitted via the antenna system 30. Since, according to the feedback signal of the communications device 31, no further improvement of the transmission conditions can be achieved, it is anticipated that the actually measured reception quality will be impaired by any change to the signals. If this is not the case, the feedback signal will deviate from the real reception quality. An optimal adaptation of the transmitted signals is not possible with this sub-optimal feedback.

Figure 5:
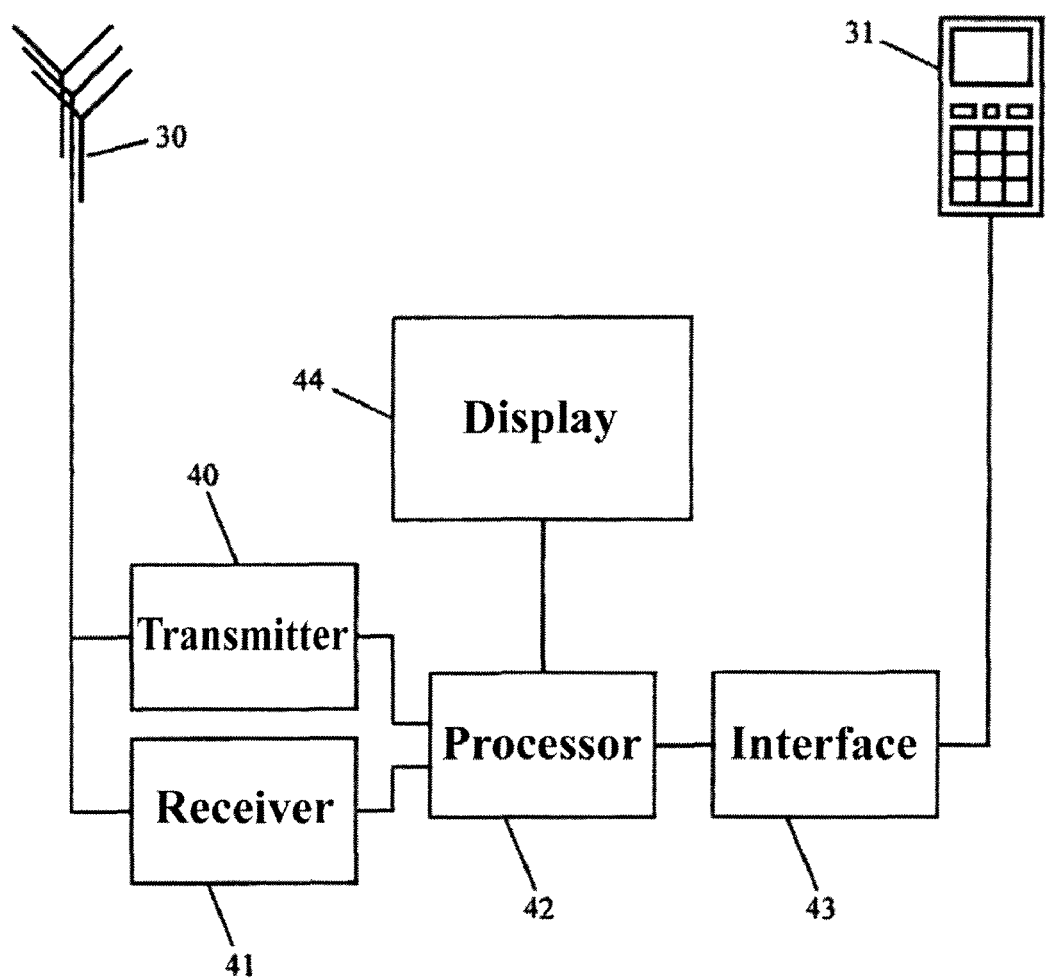
FIG. 5 shows a second exemplary embodiment of the measuring system according to the invention.

FIG. 5 shows a second exemplary embodiment of the measuring system according to the invention. Here, the structure of the measuring system is presented in greater detail. A processing device 42 is connected to a display device 44, the transmitter 40, a receiver 41 and an interface 43. The transmitter 40 and the receiver 41 are connected to the antenna system 30. The interface 43 is connected to the communications device 31.

The processing device 42 generates signals, which are transmitted to the communications device 31 via the transmitter 40, the antenna system 30 and the air interface. The communications device 31 transmits via the air interface, the antenna system 30 and the receiver 41 signals, which are processed by the processing device 42. These signals contain feedback signals, which are generated dependent upon the transmission conditions determined by the communications device 31. The receiver can be dispensed with, if the feedback signals are also transmitted to the processing device 42 via the interface 43. The processing device 42 modifies the signals transmitted via the transmitter 40 and therefore changes the signals, here, for example, the beam pattern 32 of the signal transmitted by the antenna system 30.

The processing device 42 is connected to the communications device 31 via the interface 43. By means of this link, the processing device 42 determines the actual transmission quality, for example, on the basis of the transmission rate or the bit-error rate achieved by the communications device 31. The processing device 42 compares the feedback signals with the transmission quality measured via the interface 43. Accordingly, it is possible to evaluate the quality of the feedback signals generated by the communications device.

The invention is not restricted to the exemplary embodiment presented. As already mentioned, different communications systems can be used. For example, MIMO systems and also systems with only one antenna at the transmitter and/or receiver end can be used. An integration of the measuring device and of the antenna system into one device is also conceivable. All of the features described above or illustrated in the drawings can be advantageously combined with one another as required within the framework of the invention.

The invention claimed is:

1. A method for testing a feedback signal transmitted by a communications device within a communications system,
wherein the communications device is adapted to generate feedback signals dependent upon transmission conditions of signals transmitted to the communications device via an air interface, which the communications device has determined, and
wherein an actual reception quality of the signals transmitted to the communications device is additionally measured,
the method comprising:
modifying the signals transmitted to the communications device until a feedback signal generated by the communication device displays no further possibility for improving the transmission conditions;
modifying at least one of the position of the communications device, the position of a source of the signals transmitted to the communications device, and a signal transmitted to the communication device; and
determining a quality of the feedback signal by comparing the feedback signal displaying no further possibility for improving the transmission conditions and the actual reception quality.

2. The method according to claim 1, comprising determining the actual reception quality by determining the bit-error rate and/or the data rate.

3. The method according to claim 1, wherein the signals transmitted to the communication device are transmitted to the communications device by several antennae, and the communications device receives the signals transmitted to the communication device by several antennae.

4. The method according to claim 1, wherein modifying the signals transmitted to the communications device comprises modifying a beam pattern and/or by modifying a pre-coding and/or by modifying a number of data streams of the signal transmitted using a multiplex method.

5. The method according to claim 1, wherein the feedback signal contains instructions for the modification of the signals transmitted to the communications device for the improvement of the transmission conditions.

6. The method according to claim 1, wherein the communications system is a Multiple-input Multiple-output (MIMO) communications system.

7. A measuring system for testing a feedback signal transmitted by a communications device within a communications system comprising:
an antenna system; and
a measuring device,
wherein the measuring device is arranged to transmit a signal via an air interface and the antenna system to the communications device,
wherein the communications device is arranged to receive the signal and generate the feedback signal dependent upon transmission conditions of the signal, which the communications device has determined, and transmitting the feedback signal to the measuring device, and
wherein the measuring device is arranged to measure an actual reception quality of the signals transmitted to the communications device, the measuring device being set up for performing the following:
modifying the signals transmitted to the communications device until a feedback signal generated by the communication device displays no further possibility for improving the transmission conditions;
causing a modification of at least one of the position of a source of the signals transmitted to the communications device, and a signal transmitted to the communication device; and
determining a quality of the feedback signal by comparing the feedback signal displaying no further possibility for improving the transmission conditions and the actual reception quality.

8. The measuring system according to claim 7, wherein the measuring device is connected to the communications device, and the measuring device determines the actual reception quality by determining the bit-error rate and/or the data rate.

9. The measuring system according to claim 7, wherein the antenna system is a multiple antenna system, and the communications device receives the signals transmitted to the communications device by several antennae.

10. The measuring system according to claim 7, wherein the measuring device modifies the signals transmitted to the communications device by modifying a beam pattern and/or by modifying a pre-coding and/or by modifying a number of data streams of the signal transmitted using a multiplex method.

11. The measuring system according to claim 7, wherein the feedback signal contains instructions for the modification of the signals transmitted to the communications device for the improvement of the transmission conditions.

12. The measuring system according to claim 7, wherein the measuring system comprises a transmitter and a receiver, and the transmitter and the receiver are connected to the antenna system.

13. The measuring system according to claim 7, wherein the measuring device comprises a display device and the display device presents intermediate results and/or results and/or parameters of the measurement.

14. The measuring system according to claim 7, wherein the communications system is a Multiple-input Multiple-output (MIMO) communications system.

* * * * *